(12) United States Patent
Yin

(10) Patent No.: US 9,979,478 B2
(45) Date of Patent: May 22, 2018

(54) PICO PROJECTOR WITH VISIBLE LIGHT COMMUNICATION (VLC) AND METHOD FOR VLC USING THE SAME

(71) Applicant: Ping-Hung Yin, Taipei (TW)

(72) Inventor: Ping-Hung Yin, Taipei (TW)

( * ) Notice: Subject to any disclaimer, the term of this patent is extended or adjusted under 35 U.S.C. 154(b) by 0 days. days.

(21) Appl. No.: 15/359,627

(22) Filed: Nov. 23, 2016

(65) Prior Publication Data

US 2017/0155447 A1 Jun. 1, 2017

Related U.S. Application Data

(60) Provisional application No. 62/260,259, filed on Nov. 26, 2015.

(51) Int. Cl.
| | |
|---|---|
| *H04B 10/116* | (2013.01) |
| *G02B 26/08* | (2006.01) |
| *H04B 10/50* | (2013.01) |
| *H04B 10/548* | (2013.01) |

(52) U.S. Cl.
CPC ....... *H04B 10/116* (2013.01); *G02B 26/0833* (2013.01); *H04B 10/502* (2013.01); *H04B 10/548* (2013.01)

(58) Field of Classification Search
CPC ... H04B 10/116; H04B 10/502; H04B 10/548
See application file for complete search history.

(56) References Cited

U.S. PATENT DOCUMENTS

| | | | | | |
|---|---|---|---|---|---|
| 8,237,835 | B1 * | 8/2012 | Muller | ................. | A61B 3/1025 250/201.9 |
| 9,766,449 | B2 * | 9/2017 | Bailey | .................... | G02B 26/10 |
| 2002/0149546 | A1 * | 10/2002 | Ben-Chorin | .......... | G09G 3/002 345/32 |
| 2004/0100589 | A1 * | 5/2004 | Ben-David | ......... | G09G 3/3413 348/743 |
| 2004/0218172 | A1 * | 11/2004 | DeVerse | ............... | G01J 3/2823 356/300 |
| 2007/0273983 | A1 * | 11/2007 | Hebert | ................. | G02B 5/1895 359/708 |
| 2008/0316318 | A1 * | 12/2008 | Hoffman | .............. | H04N 5/7416 348/177 |
| 2009/0269073 | A1 * | 10/2009 | Kitaji | ................. | H04B 10/1149 398/130 |
| 2012/0032241 | A1 * | 2/2012 | Huang | .............. | H01L 27/14623 257/290 |
| 2012/0182170 | A1 * | 7/2012 | Yin | ....................... | H03M 1/144 341/158 |
| 2012/0188429 | A1 * | 7/2012 | Yin | ....................... | H04N 5/3745 348/302 |
| 2012/0293697 | A1 * | 11/2012 | Yin | ....................... | H04N 5/361 348/294 |
| 2013/0065322 | A1 * | 3/2013 | Fu | ....................... | G01N 33/5306 436/501 |
| 2013/0169889 | A1 * | 7/2013 | Kubota | ............... | G06F 3/04847 348/745 |
| 2013/0201316 | A1 * | 8/2013 | Binder | .................... | H04L 67/12 348/77 |
| 2013/0242201 | A1 * | 9/2013 | Deguchi | .................. | H04N 5/40 348/724 |

(Continued)

*Primary Examiner* — Danny Leung
(74) *Attorney, Agent, or Firm* — JCIPRNET

(57) ABSTRACT

A pico projector with visible light communication has three different modes for various applications.

14 Claims, 5 Drawing Sheets

(56) References Cited

U.S. PATENT DOCUMENTS

| | | | | |
|---|---|---|---|---|
| 2014/0003823 A1* | 1/2014 | Roberts | ............. | H04B 10/5563 |
| | | | | 398/187 |
| 2014/0241735 A1* | 8/2014 | Bohler | ................ | H04B 10/116 |
| | | | | 398/186 |
| 2014/0308048 A1* | 10/2014 | Roberts | .................. | H04L 27/10 |
| | | | | 398/187 |
| 2015/0070588 A1* | 3/2015 | Yin | .................... | H04N 5/35572 |
| | | | | 348/607 |
| 2015/0124130 A1* | 5/2015 | Yin | ....................... | H04N 5/378 |
| | | | | 348/294 |
| 2015/0163423 A1* | 6/2015 | Yin | ...................... | H04N 5/3591 |
| | | | | 348/295 |
| 2015/0195042 A1* | 7/2015 | Raskar | ................ | H04B 10/502 |
| | | | | 398/118 |
| 2015/0378161 A1* | 12/2015 | Bailey | ................... | G02B 27/30 |
| | | | | 345/8 |
| 2016/0041523 A1* | 2/2016 | Ashrafi | ................ | G03H 1/2645 |
| | | | | 359/9 |
| 2016/0044256 A1* | 2/2016 | Yin | ..................... | H04N 5/2353 |
| | | | | 348/296 |
| 2016/0065872 A1* | 3/2016 | Yin | ........................ | H04N 5/378 |
| | | | | 348/308 |
| 2016/0119060 A1* | 4/2016 | Byers | ................... | H04B 10/502 |
| | | | | 398/130 |
| 2016/0157316 A1* | 6/2016 | Van Bommel | ............ | F21K 9/61 |
| | | | | 315/210 |
| 2017/0045739 A1* | 2/2017 | Usukura | ................ | G02B 27/01 |
| 2017/0064788 A1* | 3/2017 | Maa | ................... | H05B 33/0854 |
| 2017/0098429 A1* | 4/2017 | Sullivan | ................... | G09G 5/06 |
| 2017/0155447 A1* | 6/2017 | Yin | ..................... | H04B 10/116 |

* cited by examiner

| VLC_EN | VLC_High_Speed_EN | | |
|---|---|---|---|
| | State | Low | High |
| | Low | Normal Mode | Not Allowed |
| | High | Dual Mode | High Speed Mode |

FIG. 2

PICO PROJECTOR WITH VISIBLE LIGHT COMMUNICATION (VLC) AND METHOD FOR VLC USING THE SAME

FIELD

The present invention relates to a pico projector integrated with visible light communication (VLC) function and a method for VLC using the pico projector.

BACKGROUND

Pico projector architecture may have two different types, transmission type and reflection type depending on the manner of image light reaching a projector display from light source. The transmission type may include high temperature poly-silicon (HTPS) and alpha-Si as light valve; the reflection type may include digital light processing (DLP) and liquid crystal on silicon (LCoS) as reflective devices. No matter which type is employed, light source used for both types may be the same.

With RGB LED light source which includes LEDs corresponding to respective colors of red, green and blue (RGB) in pico projector applications, better color performance of projection can be obtained for micro displays (e.g. light valves for transmission-type or reflective devices for reflection type). However, colors of LED light source are very sensitive to temperature and may drift with different temperatures. Therefore, LED light sources have to be well controlled over the ambient temperature to maintain the precise colors. Heat dissipation becomes very important for pico projector with RGB LED light source. Although more lighting power may be saved due to usage of LED light source, temperature control of a miniaturized projector becomes another technical issue.

Furthermore, for the projectors with LED light source, RGB LED light are constantly on, which wastes a lot of power because each LED of the light source is only used for ⅓ period.

In addition, most visible-light-communication (VLC) applications modulate the light source with very high frequency by superimposing dummy pattern to maintain lighting performance. To enhance the VLC communication speed, existing approaches are either using different wavelength (different color light of RGB) to extend the bandwidth or using multi-input multi-output (MIMO) architecture. In micro display system including of LCD, DLP, LCoS, etc., micro displays may be used to modulate the color light intensity per micro display globally.

BRIEF DESCRIPTION OF THE DRAWINGS

Implementations of the present invention will now be described, by way of example only, with reference to the attached figures.

FIG. 2 is a table showing various operation modes of VLC pico projector system according to one embodiment of the invention.

DETAILED DESCRIPTION

Figure 1:
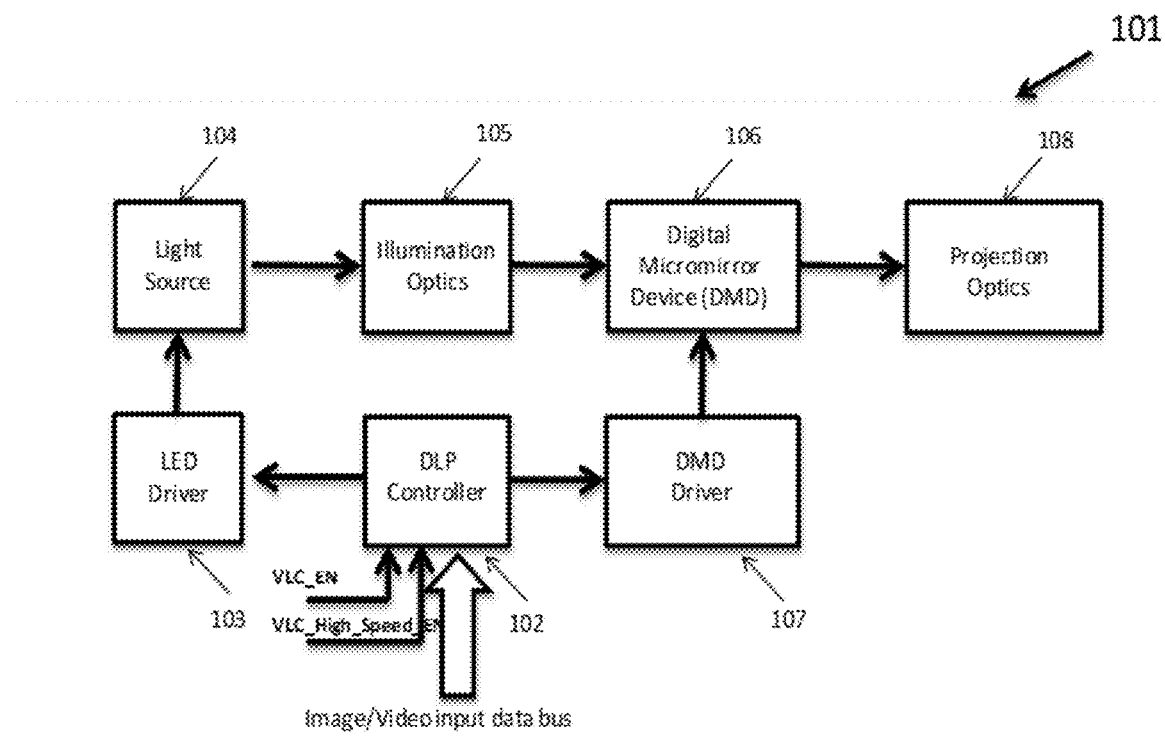
FIG. 1 is a block diagram for illustrating VLC pico projector system according to one embodiment of the invention.

It will be appreciated that for simplicity and clarity of illustration, where appropriate, reference numerals have been repeated among the different figures to indicate the corresponding or analogous elements. In addition, numerous specific details are set forth in order to provide a thorough understanding of the embodiments described hereinafter. However, it will be understood by those of ordinary skill in the art that the embodiments described hereinafter can be practiced without these specific details. In other instances, methods, procedures and components that have not been described in detail should not be taken to make the relevant features obscure. The drawings are not necessarily to scale and the proportion of certain parts may be exaggerated to better illustrate details and features. The description is not to be considered as limiting the scope of the embodiments described hereinafter.

The present invention is directed to a pico projector with VLC function and a method for VLC using the pico projector. In one embodiment of the invention, a projector with VLC function comprises: an LED light source for providing RGB color light of a first frequency for projection, and a digital micromirror device (DMD) modulated to selectively reflect the RGB light emitted by the LED light source to a receiving body; wherein the projector is configured to modulate the LED light source at a second frequency much higher than the first frequency in combination with the modulation of the DMD to enable VLC communication. In another embodiment of the invention, a method for VLC using a projector including an LED light source and a DMD, the method comprising: providing RGB color light at a first frequency for projection from the LED light source; modulating the DMD to selectively reflect the RGB color light provided from the LED light source to a receiving body; and modulating the RGB color light at a second frequency much higher than the first frequency in combination with the modulating of the DMD to enable VLC communication. In a further embodiment of the invention, a projector having three operation modes comprises: an LED light source for providing RGB color light of a first frequency for projection; and a digital micromirror device (DMD) modulated to selectively reflect the RGB color light emitted by the LED light source to a receiving body; wherein a projection mode for projecting only is configured with a modulation of the LED light source at the first frequency; wherein a projection and VLC mode for simultaneously projecting and VLC wireless communication is configured with a modulation of the LED light source at a second frequency much higher than the first frequency; and wherein a high speed VLC mode for high speed VLC wireless communication is configured with the modulation of the LED light source at the second frequency in combination with a modulation of the DMD with a PWM LSB pulse.

The present invention provides a pico projector with VLC function, which is able to manipulate X/Y addresses of the micro display array and to modulate LED light sources concurrently to achieve the same function as MIMO scheme but with focus lighting area in short distance range from 10 cm to 50 cm. By this way, the VLC channels may be increased to boost the VLC communication speed up to 125 Gps in FHD pico projector resolution.

The light source modulation scheme for VLC is based on brightness enhancement and power saving purpose. This modulation scheme has much higher modulation speed and combines with the modulation of digital micromirror device (DMD) to provide faster wireless visible light communication.

In FIG. 1, VLC pico projector system 101 has a DLP controller 102, an LED driver 103, a light source 104, illumination optics 105, a digital micromirror device (DMD) 106, a DMD driver 107, and projection optics 108.

DLP controller 102 processes various data stream format like jpeg, bmp still image or mpeg4, avi video streaming by various communication methods like RGB888 parallel data bus, or LVDS and MIPI serial high speed interface. The VLC pico projector system 101 provides two extra control signals called VLC_EN and VLC_High_Speed_EN to DLP controller, allowing the system to provide projection function only, or provide visible light communication with medium speed and projection at the same time. By a different combination of the control signals, VLC pico projector system 101 can further provide very high speed visible light communication with the speed up to 100 Gbps without projection function in short distance range (e.g., from 10 cm to 50 cm).

LED driver 103 serves as a buffer between the DLP controller 102 and the light source 104 to drive LED light source with constant current source.

The light source 104 provides light of respective colors of red, green and blue, and the light source 104 can be individually modulated RGB LEDs or white light source with separated RGB color filters to transmit color information onto the digital micromirror device 106 in color field sequential mode.

Illumination optics 105 is configured to distribute the RGB light emitted from the light source 104 uniformly onto DMD 106 for better uniformity.

Digital micromirror device (DMD) 106 is a semiconductor device composed of an array of tiltable micromirrors arranged in 2 dimensions. Each micromirror is configured to tilt its surface with plus/minus degree tilt angles (e.g. +−10 degree) according to logic states of the corresponding CMOS memory cell underneath and to receive time pulse modulated with binary PWM that provides different gray scale intensity of light for each DMD pixel (i.e., mircormirror).

DMD driver 107 is a buffer between DLP controller 102 and DMD 106 to provide high voltage about 16V and proper biasing to activate the change of tile angles of the DMD.

Projection optics 108 is an optical subsystem to adjust the focus plane of projection.

Image or video streaming data decoded by DLP controller 102 into certain format can be recognized by pico projector system. DLP controller 102 may be synchronized properly between LED driver 103 and DMD driver 107 to provide each DMD pixel with color information in color filed sequential mode in which the color information is modulated in time domain by certain color sequence, and also to align the DMD driver 107 properly to get correct modulated color information.

LED driver 103 is controlled and synchronized properly by DLP controller 102 to drive RGB light source 104 which may be used in VLC pico projector system 101. Light source 104 can be distributed uniformly via the illumination optics 105 to provide better light uniformity to DMD 106. DMD 106 is controlled by DMD driver 107 which provides high voltage and proper biasing to activate the DMD 106 status change. By modulating light source 104 and DMD 106 properly at the same time, VLC pico projector system 101 can provide correct information through projection optics 108 to a screen and/or a VLC receiver in various environments and projection distances.

Two control signals used in VLC pico projector system 101 are referred to as VLC_EN and VLC_High_Speed_EN. When VLC_EN is set to high (digital one), it means the VLC pico projector system 101 enables visible light communication feature and the RGB light source can be modulated at much higher frequency. Otherwise, VLC pico projector system 101 may act like a normal pico projector only for image projection.

There is an option for visible light communication speed controlled by VLC_High_Speed_EN signal. When VLC_High_Speed_EN is set to low (digital zero), VLC pico projector system 101 may perform the projection function and provide VLC with medium speed at the same time. While VLC_High_Speed_EN is set to high (digital one), VLC pico projector system 101 may perform high speed VLC only. According to the settings of VLC_High_Speed_EN, modulation scheme in time domain may be different for different speed VLC communication. In the meanwhile, the micromirror array of DMD is controlled by the underlying CMOS memory at much higher frequency but with lower resolution to provide VLC wireless communication with MIMO scheme. By programming the WL/BL MUX with fewer addresses, CMOS memory may refresh the DMD with much higher frequency than the normal pico projector mode.

In FIG. 2, table 201 for VLC pico projector system shows 3 major different operation modes.

When VLC_EN=0 and VLC_High_Speed_EN=0, VLC pico projector performs normal projection function only. In most popular applications for video, the frame rate is larger than 24 fps; however, in some special applications, DLP can refresh the frame up to 700 fps.

When VLC_EN=1 and VLC_High_Speed_EN=0, VLC pico projector performs normal projection function and visible light communication at the same time. However, the speed of visible light communication varies from 1M to 100M bps range. The VLC speed in this mode is highly depending on the modulation speed of LED light source.

When VLC_EN=1 and VLC_High_Speed_EN=1, the light source can be modulated with the frame packet data like frame ID, DMD refresh rate, MIMO channels information, LED light intensity, modulation frequency etc. Each DMD pixel may receive white color with R/G/B mixing. DMD may be modulated with PWM least significant bit (LSB) pulse so as to provide highest speed available for VLC communication of the pico projector. For various DMDs, the refresh rate may differ. According to one embodiment of the present invention, refresh time of about 15 us for high speed DMD is achievable and the frequency can reach as high as 125 Gps for FHD array with lens without MTF degradation or channel cross talk.

The mode that VLC_EN=0 and VLC_High_Speed_EN=1 is not allowed.

Figure 3:
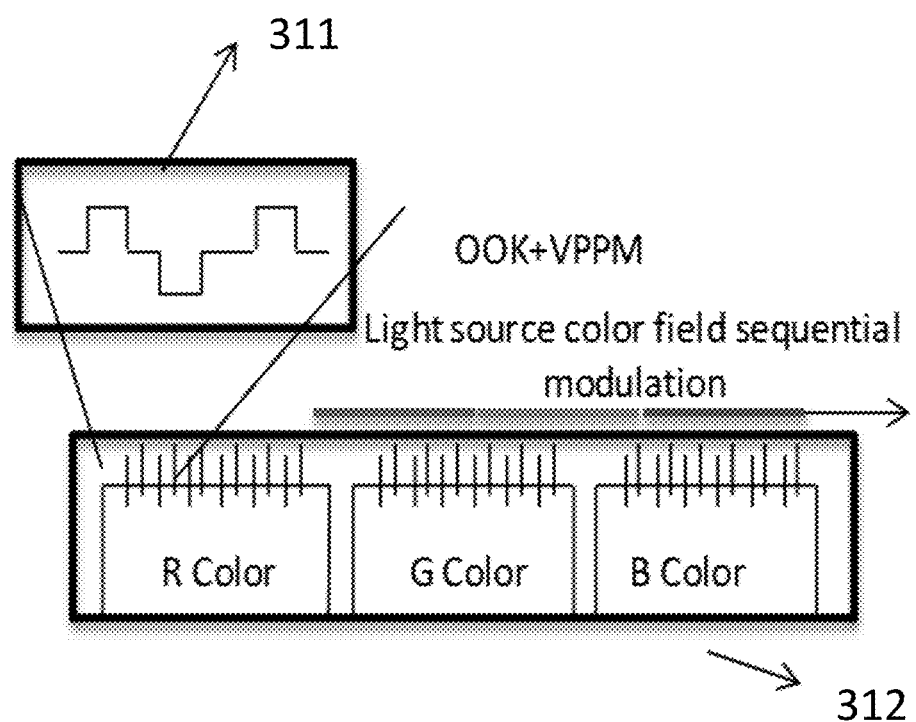
FIG. 3 shows the light source modulation waveform of the dual mode presented in FIG. 2.

FIG. 3 illustrates the signal waveform in time domain when VLC pico projector is set to the dual mode (i.e., projection and VLC at the same time). Block 312 shows the LED RGB light signal waveform in color sequence for image projection. Block 313 shows the detailed VLC signals with much higher LED on/off frequency and that phase modulation frequency varies on top of low-frequency RGB modulation ranged normally from 30 fps to 120 fps for pico projector color modulation.

The IEEE Standard for local and metropolitan area networks-Part 15.7: Short-range wireless optical communication using visible light was published at Sep. 6, 2011. The standard defines a PHY and MAC layer for short range optical wireless communications using visible light wavelength spectrum from 380 nm to 780 nm. The standard is capable of delivering data rates sufficient to support audio and video multimedia services of which the speed range is from 10 k to 100M bps.

OOK (on-off keying) modulation is sent with a symmetric Manchester symbol. Compensation time has to be inserted into the data frame to adjust the average intensity of the perceived source.

VPPM (variable pulse-position modulation) is a modulation scheme adapted for pulse width based light dimming and offers protection from intra-frame flicker.

All the standard protocol defined in IEEE 802.15.7 can be used in VLC pico projector system in dual mode to provide the display and communication.

Most of VLC systems must contend with multipath propagation, since the light from the LED may travel to the receiver along a direct line of sight path as well as along multiple reflected paths. The projection optics and reflection optics for MIMO VLC receiver must be arranged in focus area to reduce all such kind of multiple reflected paths and to minimize the channel to channel crosstalk. As a result, the MIMO channels and speed are enhanced.

Figure 4:
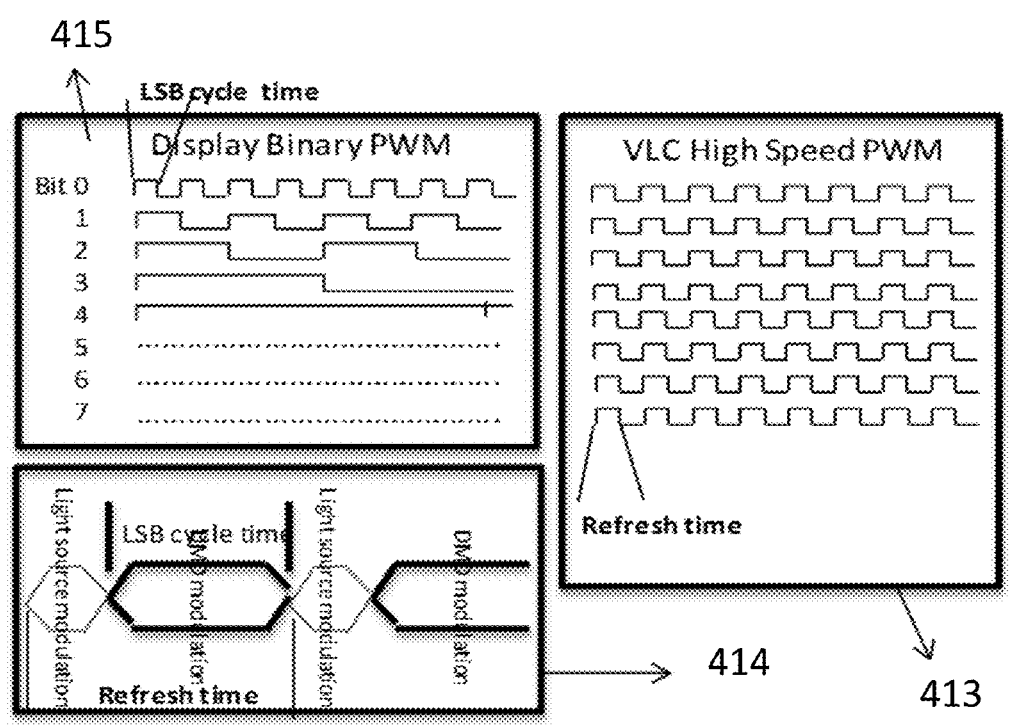
FIG. 4 shows the timing sequence for the high speed VLC mode presented in FIG. 2.

FIG. 4 illustrates how VLC pico projector system updates data. Display binary PWM 415 illustrates the PWM waveform for image projection function of the pico projector.

VLC high speed PWM 413 is provided in high speed mode which is the case of VLC_EN=1 and VLC_High_Speed_EN=1 for the VLC pico projector system. VLC high speed PWM 413 has major differences from display binary PWM 415 in Bit [7:1]; for current existing pico projector, projection function may be represented as 256 gray scale which needs 8 bit binary PWM function. By combining all the pulse and averaging the pixel light intensity in human eye, high resolution bit depth may be obtained.

VLC pico projector system in high speed mode refreshes all the VLC data the same as Bit [0], which means the data refreshing rate will follow the minimal refresh time to achieve highest speed VLC data transmission.

Block 414 illustrates the details of refresh time. One straight forward idea is that the refresh time for VLC is equal to light source modulation time added by LSB (i.e., Bit[0]) cycle time. LSB cycle time of ~15 us can be achievable. Frame packet data would be carried in much higher speed light source modulation for which normally 100 MHz is achievable.

RGB LED light source may carry different information which provides 3 times faster speed for light source modulation. For example, as for frame packet data such as receiver sensitivity and light source intensity, information needs to take data of 30 bytes, which equals to 30×8/3=80 bits. The time taken to transmit this quantity of data is 10 ns×80=800 ns. Therefore, the total refresh time=0.8 us+15 us, which is ~16 us. For FHD resolution, VLC pico projector can transmit data up to 125 Gbps.

$$MIMO\ VLC\ Speed = (1/16\ \mu s) \times 2 \times 10^6 (FHD\ channels)$$
$$= 1.25 \times 10^{11}$$
$$= 125\ Gps$$

Figure 5:
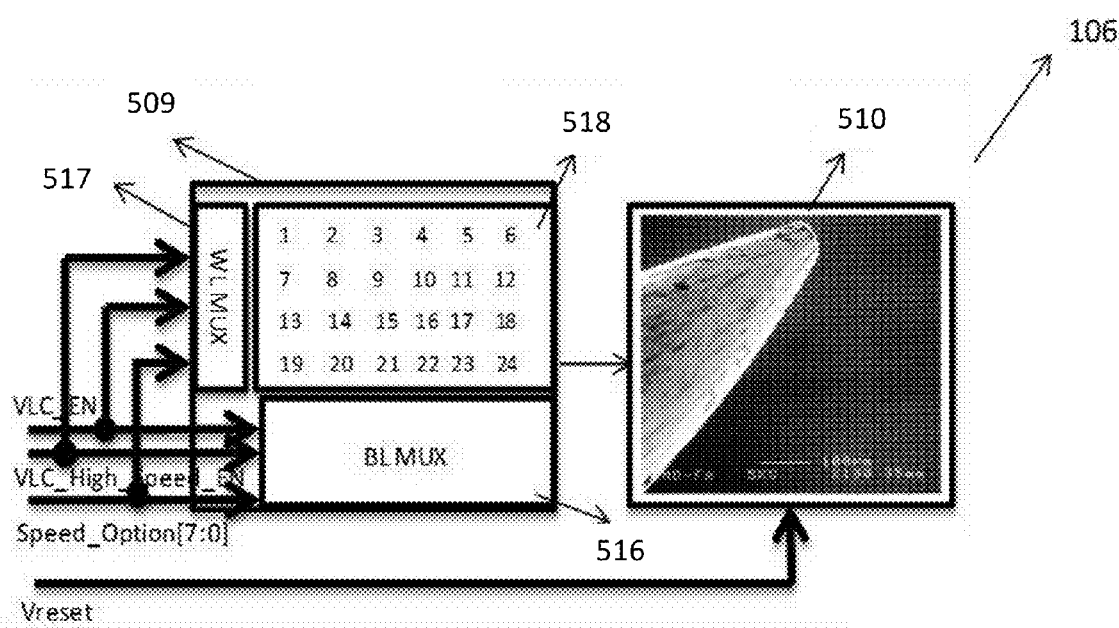
FIG. 5 shows speed options for VLC pico projector system according to one embodiment of the invention.

FIG. 5 schematically represents the array of micromirrors for DMD 106 as shown in FIG. 1 in detail. The DMD includes CMOS memory 509 and micromirror array 510 that overlies on the CMOS memory, in which each micromirror corresponds to an underlying memory cell. CMOS memory 509 and micromirror array 510 are both controlled by DLP controller 102 and DMD driver 107 as shown in FIG. 1 through control signals VLC_EN, VLC_High_Speed_EN, Speed_Option [7:0] and Vreset. The data refreshing operation of DMD 106 basically can be divided into two steps.

Step 1: Load the data to CMOS memory 509 and micromirror array 510 will not change mirror tilt angle immediately at this time.

Step 2: Vreset may activate the micromirror array 510 once the loading of the data to CMOS memory 509 finished, and each of micromirrors will change the tilt angle according to the loaded data (i.e., the logic state). CMOS memory 509 includes WL MUX 517 for Y-dimension address decoding of CMOS memory cells array 518 and BL MUX 516 for CMOS memory cells array 518 loading data. Therefore, the reflection of the RGB color light by the DMD can be determined by tilting the micromirrors of the DMD array.

VLC pico projector system 101 as shown in FIG. 1 provides projection function and visible light communication function in different options which are required to program CMOS memory 509 through WL MUX 517 and BL MUX 516 and to change the PWM binary waveform to follow LSB in high speed mode. Speed_Option [7:0] can be considered as a subset of high speed mode in VLC pico projector system 101 for which receiver side system can be taken into account for speed optimization consideration. Different receiver specification may need different speed options of VLC pico projector system 101.

The embodiments shown and described above are only exemplary embodiments. Many details are often found in the art such as other features of a circuit board assembly. Therefore, many such details are neither shown nor described. Even though numerous characteristics and advantages of the present disclosure have been set forth in the preceding description, together with the details of the structure and function of the present disclosure, the disclosure is illustrative only. Changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A projector with visible light communication (VLC) function, comprising:
    an LED light source for providing RGB color light of a first frequency for projection; and
    a digital micromirror device (DMD) modulated to selectively reflect the RGB light emitted by the LED light source to a receiving body;
    wherein the projector is configured to modulate the LED light source at a second frequency much higher than the first frequency in combination with the modulation of the DMD to enable VLC communication, and the projector is further configured to modulate the DMD with fewer X/Y addresses and the LED light source concurrently to provide a same function as multi-input multi-output (MIMO) VLC function.

2. The projector of claim 1, further comprising an illumination optics via which the LED light source is so distributed that better light uniformity can be provided onto the DMD.

3. The projector of claim 1, wherein the DMD is a semiconductor device composed of an array of tiltable micromirrors arranged in two dimensions, each micromirror being configured to tilt its surface with two different tilt angles according to logic states of an underlying memory cell.

4. The projector of claim 1, wherein the DMD is modulated with a PWM least significant bit (LSB) pulse so as to provide highest speed available for VLC communication of the projector.

5. The projector of claim 3, wherein the selective reflection of the RGB color light by the DMD is determined by tilting the micromirrors of the array.

6. The projector of claim 1, wherein the receiving body includes a screen and/or a VLC receiver.

7. A method for VLC using a projector including an LED light source and a digital micromirror device (DMD), the method comprising:
   providing RGB color light at a first frequency for projection from the LED light source;
   modulating the DMD to selectively reflect the RGB color light provided from the LED light source to a receiving body;
   modulating the RGB color light at a second frequency much higher than the first frequency in combination with the modulating of the DMD to enable VLC communication; and
   modulating the DMD with fewer X/Y addresses and the LED light source concurrently to provide a same function as MIMO VLC function.

8. The method of claim 7, wherein the step of providing further comprising:
   distributing the LED light source via an illumination optics such that better light uniformity can be provided onto the DMD.

9. The method of claim 7, wherein the step of DMD modulating further comprising:
   modulating the DMD with a PWM least significant bit (LSB) pulse so as to provide highest speed available for VLC communication of the projector.

10. The method of claim 7, wherein the receiving body includes a screen and/or a VLC receiver.

11. A projector having three operation modes, comprising:
   an LED light source for providing RGB color light of a first frequency for projection; and
   a digital micromirror device (DMD) modulated to selectively reflect the RGB color light emitted by the LED light source to a receiving body;
   wherein a projection mode for projecting only is configured with a modulation of the LED light source at the first frequency;
   wherein a projection and VLC mode for simultaneously projecting and VLC wireless communication is configured with a modulation of the LED light source at a second frequency much higher than the first frequency; and
   wherein a high speed VLC mode for high speed VLC wireless communication is configured with the modulation of the LED light source at the second frequency in combination with a modulation of the DMD with a PWM least significant bit (LSB) pulse.

12. The projector of claim 11, further comprising an illumination optics via which the LED light source is so distributed that better light uniformity can be provided onto the DMD.

13. The projector of claim 11, wherein the projector is further configured to modulate the DMD with fewer X/Y addresses and the LED light source concurrently to provide a same function as multi-input multi-output (MIMO) VLC function.

14. The projector of claim 11, wherein the receiving body includes a screen and/or a VLC receiver.

* * * * *